July 28, 1925.
V. L. HOLT
STUMP PULLER
Filed Aug. 4, 1924
1,547,496
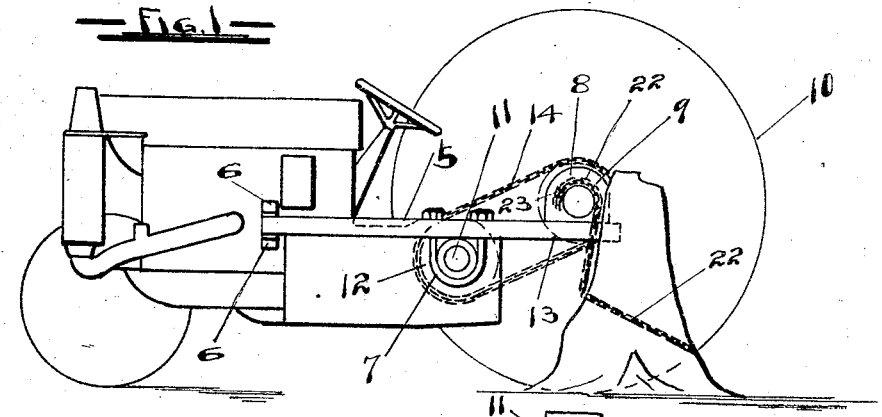
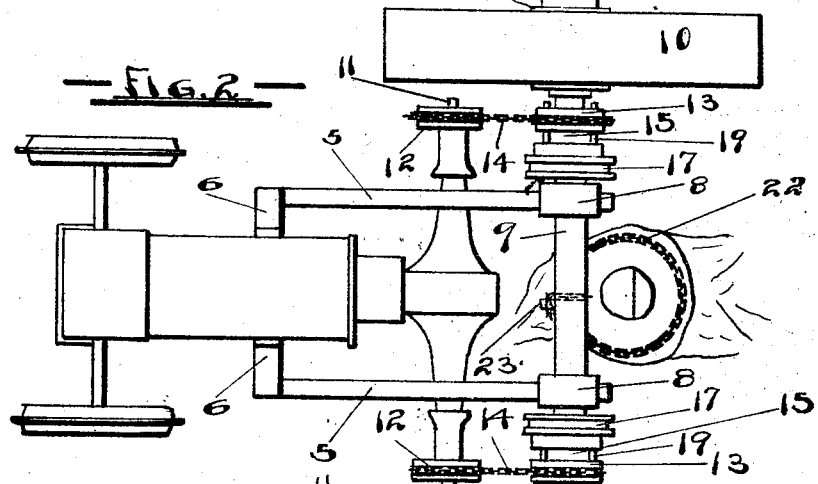
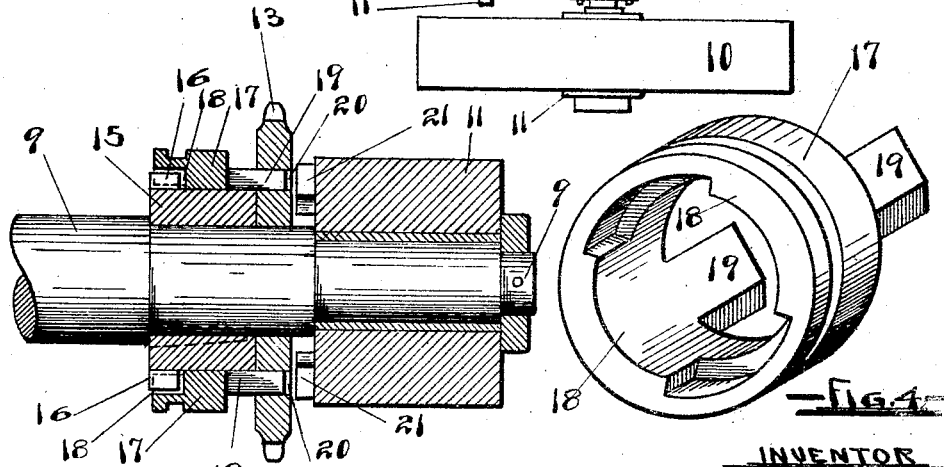
INVENTOR
VICTOR L HOLT
BY C. F. Blake
ATTY Patented July 28, 1925.

1,547,496

UNITED STATES PATENT OFFICE.

VICTOR L. HOLT, OF PORTLAND, OREGON.

STUMP PULLER.

Application filed August 4, 1924. Serial No. 730,102.

*To all whom it may concern:*

Be it known that I, VICTOR L. HOLT, a citizen of the United States, residing at Portland, county of Multnomah, State of Oregon, have invented certain new and useful Improvements in Stump Pullers, of which the following is a specification.

My invention relates to stump pullers in general, and particularly to stump pullers attachable to tractors, the object being to provide a device attachable to a tractor in such a manner as to leave an uncovered shaft adjacent the stump when the tractor is backed into proximity thereto, means upon said shaft for attaching lifting chains thereto, tractor propelling wheels upon said shaft to form a support therefor during the pulling process without any overturning tendency upon the tractor, and clutch mechanism for driving either said shaft or said wheels from the drive shaft of the tractor.

I accomplish the above object by means of the construction illustrated in the accompanying drawing, which is a part of this application for Letters Patent, like characters indicating like parts throughout the several views thereof, and in which:

Fig. 1 is a side elevation of a tractor with my device installed thereon.

Fig. 2 is a plan view of the same.

Fig. 3 is an enlarged detail sectional view of the clutch mechanism.

Fig. 4 is a perspective view of the clutch ring.

In general my device consists of a frame attachable to the tractor and projecting rearward therefrom, with a transversely disposed shaft journaled upon the rearward end of said frame, tractor wheels rotatably mounted upon the ends of said shaft, transmission mechanism between the drive shaft of the tractor and said transversely disposed shaft, said transmission mechanism being rotatable in that part thereof which is mounted upon said transversely disposed shaft, and clutch mechanism adapted to engage either said transversely disposed shaft or said tractor wheels with said transmission mechanism, and means upon said transversely disposed shaft for engaging with lifting chains.

The frame consists of a pair of rearwardly projecting side members 5 secured to the body of the tractor in any convenient manner, as by the clips 6 and the U bolts 7. Journaled in boxes 8 upon the rear ends of said side members 5 is a transversely disposed shaft 9, which shaft is uncovered between said side members. Upon the ends of said shaft are rotatably mounted tractor wheels 10, the hubs 11 of which may be bushed, as shown in Fig. 3.

Transmission mechanism is provided between the drive shafts 11 of the tractor and said shaft 9, which may conveniently be sprockets 12 secured upon said shafts 11 and sprockets 13 rotatably mounted upon said shaft 9, with chains 14 running upon said sprockets.

To the drive shaft 9 from the sprockets 13 I provide a sleeve 15 secured upon the shaft 9 and having radially projecting lugs 16 thereupon, as shown in detail in Fig. 3. Freely mounted upon said sleeve is a clutch ring 17, having the usual peripheral groove thereupon, and operated by the usual forked levers, which being well known to the art are not illustrated in the drawing. Said clutch rings are provided with lugs 18 adapted to engage with the lugs 16 upon the sleeve 15, and also with arms 19 adapted to project into and through suitable orifices 20 in the sprockets 13, as shown in Fig. 3.

Thus the sprockets 13 which are loose upon the shaft 9 are connected by said clutch ring 17 and its arms 19 and lugs 18 to the sleeve 15 which is secured upon the shaft, and thus said shaft is driven from the drive shafts of the tractor.

To drive the tractor wheels 10 I provide upon the hubs 11 thereof lugs 21 adapted to engage with the arms 19 of the clutch ring when the same are caused to project through the orifices 20 in the sprockets 13 by moving the clutch rings towards said sprockets. Simultaneously with the engaging of said lugs 21 with the arms 19 the lugs 16 and 18 upon the sleeve 15 and clutch ring 17 respectively are disengaged, thus freeing the sprockets 13 from any connection with the shaft 9.

Thus it is obvious that by operation of the clutch mechanism just described, either the tractor wheels 10 of the shaft 9 may be driven from the drive shafts of the tractor, each independently of the other.

To pull a stump I provide suitable means of securing a hitch member such as the chain 22 to the shaft 9, conveniently being simply a pin 23 in said shaft to which the chain may be secured.

To operate my device the wheels 10 are clutched to the sprockets 13 by means of the clutch rings 17, and the tractor is backed against the stump as shown in Figs. 1 and 2. A hitch is then made around the stump with the chain 22 and said chain is secured upon the shaft 9 by means of the pin 23. The wheels 10 are then disengaged from the sprockets 13 and said sprockets are engaged with the shaft 9 by means of the clutch ring 17 and the sleeve 15. It is obvious from Fig. 1 that rotation of the shaft 9 will then pull the stump from the ground with a substantially vertical pull, and with great leverage.

When the stump has thus been pulled it may be hauled away by the tractor.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. A tractor; a frame rearwardly extending from said tractor; a shaft transversely mounted upon said frame; a sling; means for securing said sling upon said shaft; and means for rotating said shaft from the power shaft of said tractor.

2. A tractor; a frame rearwardly extending from said tractor; a shaft transversely mounted upon said frame; tractor wheels freely mounted upon said shaft; driving mechanism upon said shaft; means for connecting said driving mechanism with the drive shaft of said tractor; clutch mechanism for engaging said driving mechanism with said shaft or with said wheels; and hoisting mechanism mounted upon said shaft.

3. A tractor; tractor wheels; a shaft freely mounted upon said wheels; a frame connecting said shaft with said tractor; driving mechanism between said shaft and said tractor; clutch mechanism adapted to engage either said shaft or said wheels with said driving mechanism; and hoisting mechanism upon said shaft.

4. A shaft; a wheel freely mounted upon said shaft; lugs upon said wheel; a sleeve secured to said shaft; lugs upon said sleeve; a sprocket freely mounted upon said shaft intermediate said wheel and said sleeve, and having orifices therein; a clutch ring freely mounted upon said sleeve and longitudinally slidable thereon; lugs upon said clutch ring adapted to engage the lugs upon said sleeve; and arms upon said clutch ring projecting through the orifices in said sprocket and adapted to engage the lugs upon said wheel.

In witness whereof I claim the foregoing as my own I hereunto affix my signature in the presence of two witnesses at Portland, county of Multnomah, State of Oregon, this 5th day of Nov. 1923.

VICTOR L. HOLT.

Witnesses:
L. J. ROBINSON,
C. F. BLAKE.